May 24, 1932.　　　　C. S. ASH　　　　1,860,216
BALANCED MOTOR VEHICLE WHEEL
Filed March 27, 1924
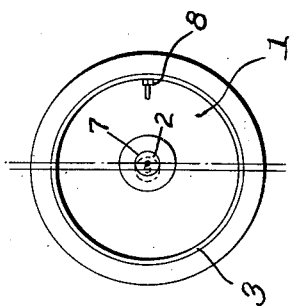
Inventor
Charles S. Ash.
By Patented May 24, 1932

1,860,216

UNITED STATES PATENT OFFICE

CHARLES S. ASH, OF ROYAL OAK, MICHIGAN, ASSIGNOR TO KELSEY-HAYES WHEEL CORPORATION, OF DETROIT, MICHIGAN, A CORPORATION OF NEW YORK

BALANCED MOTOR VEHICLE WHEEL

Application filed March 27, 1924. Serial No. 702,208.

In the manufacture of wheels for motor vehicles it has been the usual practice to so manufacture these wheels that they will run in practically true balance but it is a known fact that when a tire is applied to such wheels, that they are thrown out of balance due to the presence of the weight of the tire valve and also in some instances, due to the unbalanced condition of the means for securing the tire in place. Since the advent of the present tire of large cross sectional area and thin wall, known as the balloon tire, it has been found that this unbalanced condition sets up a vibration which is quite apparent and undesirable in motor vehicles equipped with balloon tires. This unbalanced condition would, however, have less effect if the wheels of the vehicle were always turning in exact unison, at the same speed and in the same relation, but due to the fact that the four wheels of the vehicle may turn independently of each other and that the four tires may not be all inflated under the same pressure, it is evident that the four wheels will not turn in unison and will not bear a fixed relative rotation so that the relative unbalanced condition is constantly changing.

It is therefore most desirable that each complete wheel including its tire and all of its parts have an exact running balance independently of the other wheels of the vehicle, and this is particularly true where tires of the balloon type are used.

In the manufacture of tires it is not practical, due to the additional cost to so manufacture each tire that it will be in running balance and it has been the usual practice to manufacture wheels complete without their tires, and give these wheels a running balance, but when tires are applied to the wheels each wheel as a whole is thrown out of balance by the application of the unbalanced tire thereto.

In the present instance it is proposed to manufacture each wheel in an unbalanced condition so that when a tire is applied thereto, the complete wheel ready for use will be in a perfect running balance and this unbalanced condition of the wheel may be secured through the application of an added amount of weight at the side of the periphery of the wheel or its demountable or fixed rim, opposite the position of the tire valve when the tire is applied to the wheel or rim to counterbalance the weight of the valve or other parts employed in securing the tire in place which will tend to throw the wheel out of balance, or this out of balance condition may be secured by building the wheel or rim itself out of balance with a greater proportion of the weight of the wheel or rim distributed throughout that portion of the wheel which will be opposite the side of the wheel to which the greater proportion of the weight of the tire will be located when the tire is applied to the wheel.

There are now used three distinct types of motor vehicle wheels, to-wit, the wood or artillery wheel, the wire wheel or wheel provided with wire spokes, and the disk wheel or wheel in which the web connecting the hub and rim comprises a thin metal disk or disks. The unbalanced condition is found in all these types of wheels as now in use with a tire applied thereto, and as all of these types may be equipped with balloon tires it is desirable that all wheels for use upon motor vehicles and particularly those of small diameter for the application of balloon tires, should be individually in running balance when fully equipped and in place upon the vehicle.

These different types of wheels are also constructed with tire rims which are an integral part of the wheels, and also with demountable rims, and wherever in the present application a "wheel" is referred to, it is to be understood that the same is to be understood as including its rim whether wholly or partially integral or whether demountable, and where a demountable rim is employed, such rim may be formed out of running balance to counterbalance the unbalanced weight of a tire to be applied thereto.

The main object of the present invention is to secure, in any type of wheel when finished and ready for the application of a tire thereto, an out of running balance condition, but the wheel as a unit, after the placing of the tire thereon, will be in perfect running balance and the vibrations set up in use by this unbalanced condition will be eliminated. A further object is to provide a simple method whereby an exact predetermined unbalanced condition of the wheel may be obtained in the manufacture of the wheel itself to provide a perfect running balance of the complete wheel including its tire, in use.

With the above and other ends in view the invention consists in the matters hereinafter set forth and more particularly pointed out in the appended claim, reference being had to the accompanying drawing, in which The figure is a side elevation of a disk wheel showing a tire in place thereon and illustrative of one method of securing an unbalanced condition of the wheel itself and a perfect running balance of the complete wheel with the tire in place thereon.

In the manufacture of motor vehicle wheels each wheel is made up with a hub and continuous fixed felloe band or rim and a web portion comprising either wood or wire spokes or a disk, placed under tension or compression between the continuous felloe band or rim and the hub. The tire is applied directly to the rim or felloe band which forms a seat therefor or applied to a demountable rim seated upon the felloe band and detachably secured in place thereon. Wheels as a unit are therefore usually manufactured in a factory devoted to that purpose with the hub felloe or rim and web portion assembled ready to receive a tire or tire and demountable rim, and this assembled structure is so proportioned and adjusted before leaving the factory that the wheel will have a substantially perfect running balance upon an axle to which the wheel may be applied. No provision is made to take care of the unbalanced condition of a tire which may be applied to the wheel and as these tires are usually made up in another factory and applied to the wheel or rim by the motor vehicle manufacturer, the wheels of the vehicle in use upon the vehicle are out of running balance and set up an undesirable vibration, due mainly to the manner in which the front or steering wheels are commonly mounted upon their axle.

It is the usual practice of tire manufacturers to manufacture each tire, independently of the metal parts thereof, so that it will be a running balance, but no provision is made for counterbalancing the weight of the metal parts when applied to the tire as this could only be accomplished by adding a considerable weight of rubber to the side of the tire opposite that to which the metal parts are applied, and due to the method of manufacture of rubber tires this would not be feasible and would add materially, not only to the cost of manufacture, but also to the cost of material.

The present invention contemplates the production of a complete wheel ready for the application of a tire thereto, by the usual methods of manufacture, but in an unbalanced condition, that is, a condition in which the wheel will be out of running balance to a certain predetermined amount and in the proper manner so that when the usual tire is applied to the wheel by the motor vehicle manufacturer, the wheel as an entirety will be in perfect running balance.

In the figure is illustrated an unbalanced wheel illustrating the method and means for providing this unbalanced condition and the type of wheel shown is a disk wheel wherein a disk 1 of any suitable form in cross section is secured in any suitable manner at its inner edge portion to the hub 2 and is riveted or otherwise rigidly and permanently secured at its outer edge or formed with an integral fixed permanent rim or felloe band 3 which rim or band is continuous and of a fixed diameter.

As illustrated in the figure an unbalanced condition of the wheel as a unit may be secured through the formation of the disk portion of the wheel, wherein the hub 2 is slightly offset from the axis of the disk as shown at 7 to provide a greater weight of material at one side of its turning axis than at the opposite side thereof, at which side its rim is provided with an opening for a valve stem 8 of a tire.

The present method of securing a complete wheel, including its tire, which will be in perfect running balance, consists in determining the amount of weight required to counterbalance the unbalanced weight of a tire to be applied to the wheel, and in providing a wheel unit having unbalanced weight so positioned as to counterbalance the unbalanced weight of a tire applied to the wheel, and it is obvious that methods or means of securing such unbalanced condition to the wheel unit other than as illustrated in the accompanying drawing and described herein may be employed, and therefore all such means or methods as fall within the scope of the appended claim are contemplated.

What I claim is:—

A wheel for motor vehicles comprising two unbalanced units, one mounted upon the other with the unbalanced weight of one unit in opposed relation to the unbalanced weight of the other unit, the inner of said units being offset laterally of its axis of rotation to unbalance said unit.

In testimony whereof I affix my signature.

CHARLES S. ASH.